Patented Oct. 13, 1925.

1,557,318

UNITED STATES PATENT OFFICE.

EMIL E. NOVOTNY, OF LOGAN, AND CHARLES J. ROMIEUX, OF PHILADELPHIA, PENNSYLVANIA, ASSIGNORS TO JOHN STOGDELL STOKES, OF HUNTINGDON VALLEY POST OFFICE, PENNSYLVANIA.

COMPOSITE BODY.

No Drawing.   Application filed October 1, 1923.   Serial No. 666,030.

*To all whom it may concern:*

Be it known that we, EMIL E. NOVOTNY and CHARLES J. ROMIEUX, citizens of the United States, and residents of Logan, Philadelphia, in the county of Philadelphia and State of Pennsylvania, and of West Philadelphia, Philadelphia, in the county of Philadelphia and State of Pennsylvania, have invented certain new and useful Improvements in Composite Bodies, of which the following is a specification.

This invention relates to composite bodies of the synthetic resin type and more particularly to the production of such products containing a sufficient amount of lubricant therein so as to permit the punching or shearing without being preliminarily heated in order to induce thermoplasticity.

It is well known that very satisfactory products can be produced from synthetic resins such as phenolic condensation products of formaldehyde or furfural in various shapes such as laminated structures, tubes, etc. These products are very useful in the mechanical and electrical arts because of their great strength and desirable electrical properties. However, such products, unless in extremely thin layers, cannot be sheared, punched or bent when cold. This has been a serious drawback to the more general utilization of synthetic resin products where a large multiplicity of similar shapes are required because such operations could more readily be performed with materials of the vulcanized or hard fibre type. What we aim to do is to produce laminated sheets of the synthetic resin type which will have the qualifications before enumerated as to strength and electrical qualities, and at the same time possess the useful attributes of the less satisfactory vulcanized fibre.

Through actual experimentation we have determined that a much thicker sheet of laminated fibre of the synthetic resin type can be punched when the plunger of the punch is thoroughly lubricated. Of course it is obvious that this method is extremely crude inasmuch as is would not be possible to carry the lubricant far beyond the surface of the laminated fibre, and that therefore other means must be devised in order to carry such lubricant in situ in the material. On the other hand, very thin sheets, as before mentioned, may be punched without the use of any lubricant for the simple reason that there is less resistance and friction offered to the punch or shear because of the thinness of the product.

Substantially this invention covers the introduction of a suitable lubricant into the fibre of a sheetlike structure either formed or woven, as paper or cloth, or into comminuted material such as wood flour, cellulose or asbestos. As we find that the preferred lubricants for this purpose do not readily dissolve in the synthetic resins or their solvents, we preferably impregnate these into the paper cloth or filler either through the use of suitable solvents or by other mechanical means, and subsequently impregnate or incorporate the desired amount of synthetic resin product.

As the function is one of lubrication, it is preferable not to use materials which are solid solvents of the synthetic resins inasmuch as the lubricating property of these materials is not as marked. Therefore, if the lubricant is not soluble in the resin or in its solvents, and where impregnation or incorporation of the lubricant and resin is to be performed in one operation, we resort to the use of emulsification and thereby suspension in the resin solution. This emulsification and suspension can be attained in various well known ways as, for example, where lanolin, neat's-foot oil or linseed oil is to be used for this purpose these oils may be mechanically mixed with the resin solution or they may be previously dissolved or suspended in a suitable solvent and in this manner introduced and mixed therewith.

Example 1. Where paraffin is used as a lubricant, this is preferably incorporated in the paper, cloth or filler, first, by either dissolving the paraffin in a suitable benzol solution or applying the paraffin without a solvent by means of suitable heated devices. We find that the best lubrication is obtained where kraft paper of a thickness of about .003" is used, when say approximately two and one-half per cent of the weight of the paper in paraffin is so introduced. However, it is not necessary to specify any definite limits inasmuch as certain classes of work may require a larger amount of such lubricant, and for other classes of lower percentage may be used. We find, also, that paraffin oil or suitable mineral oil can be used in place of the paraffin; likewise, the waxes such as, for example, beeswax.

Example 2. Where lanolin is used as a lubricant, it is preferably suspended in a suitable amount of benzol solution which is mixed with the alcohol resin solution and the impregnation is carried out in the usual manner. In the case of lanolin, approximately five per cent when used in conjunction with the kraft paper previously mentioned seems to be the most desirable. However, here, too, the particular class of punching material to be made determines to a great extent the amount of lanolin which the sheet of paper is to carry. We have gone as high as twenty-five per cent in lanolin of the weight of the paper stock used, and still found products which were firm and tough but very pliable and capable of being cut and punched cold more readily than vulcanized fibre. In this example, too, the lanolin could be mechanically applied to the paper cloth or filler prior to the operation of saturating or coating the sheet with the phenol resin.

Where paper laminated products are made, the nature of the paper and the thickness of it has a great deal to do with the facility with which cold punching and shearing can be performed. We find that the more compact varieties of paper, such as kraft, when used in thin sections require a great deal less lubrication than the more openly formed structures such as blotting paper. Likewise, the thinner the laminæ the more flexible the product and the greater the ease of punching and shearing.

Where it is desirable to have one or both surfaces of the pressed up laminated structure free from any grease or lubricant, as where it is desirable to utilize the material for friction producing or resisting purposes, one or both faces may be formed with a facing of synthetic resin product impregnated into paper or cloth without the admixture therewith of a lubricant. This facing may be thin enough so that it will not interfere at all with the cold punching or shearing of the product. This method will enable the production of panels, etc., which will be free from smudging which would be apparent if the lubricant were in situ throughout the structure.

We do not wish to limit ourselves to the precise materials described, as any lubricant which will have the desired effect of enabling the punching of paper products of the laminated synthetic resin type up to thicknesses of one-eighth inch is considered as equivalent to the broad disclosure of introducing a suitable lubricant in situ. What we consider as our invention is the introduction of a free or uncombined lubricant very thoroughly and minutely dispersed throughout the structure of such hard, set and infusible synthetic resinous material.

What we claim is—

1. A moldable composite body comprising a fibrous filler containing lanolin and a synthetic resinous binder therefor substantially as described.

2. A molded and infusible composite body comprising a fibrous filler containing a free lubricant and a synthetic resinous binder therefor substantially as described.

3. The herein described method of making a molded composition composed of a fibrous filler containing a free lubricant and a synthetic resinous binder comprising impregnating or coating a fibrous filler with a lubricant and a synthetic resin and subsequently pressing, forming and heating to set the resinous body to an infusible form.

Signed at Philadelphia in the county of Philadelphia and State of Pennsylvania, this 29th day of Sept., A. D. 1923.

EMIL E. NOVOTNY.
CHARLES J. ROMIEUX.